Dec. 17, 1935.  W. BROWN  2,024,272
STROPPING AND HONING DEVICE
Filed Sept. 20, 1933   2 Sheets-Sheet 1
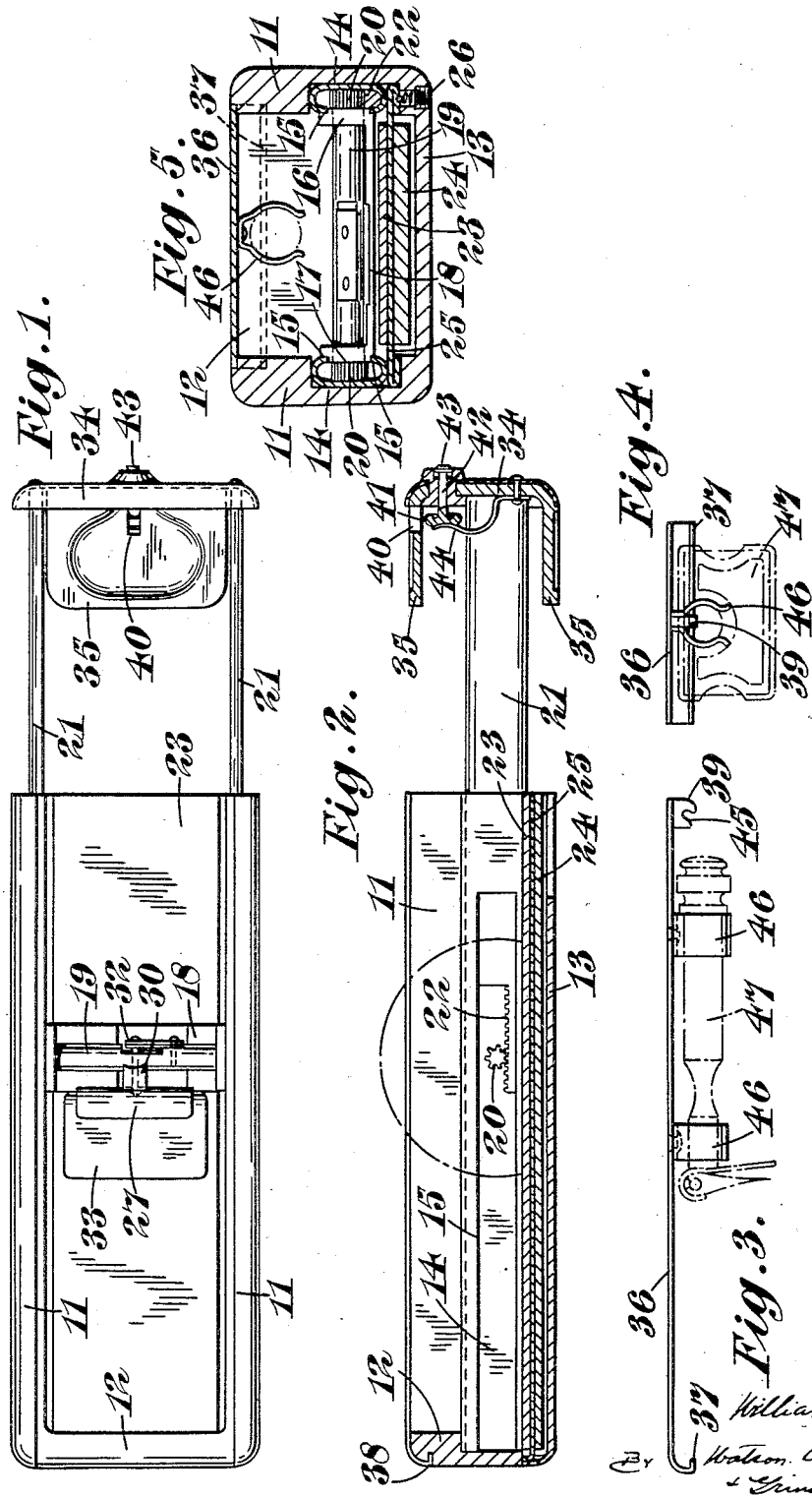
INVENTOR
William Brown,
By Watson, Coit-Moure
& Grindle ATTYS.

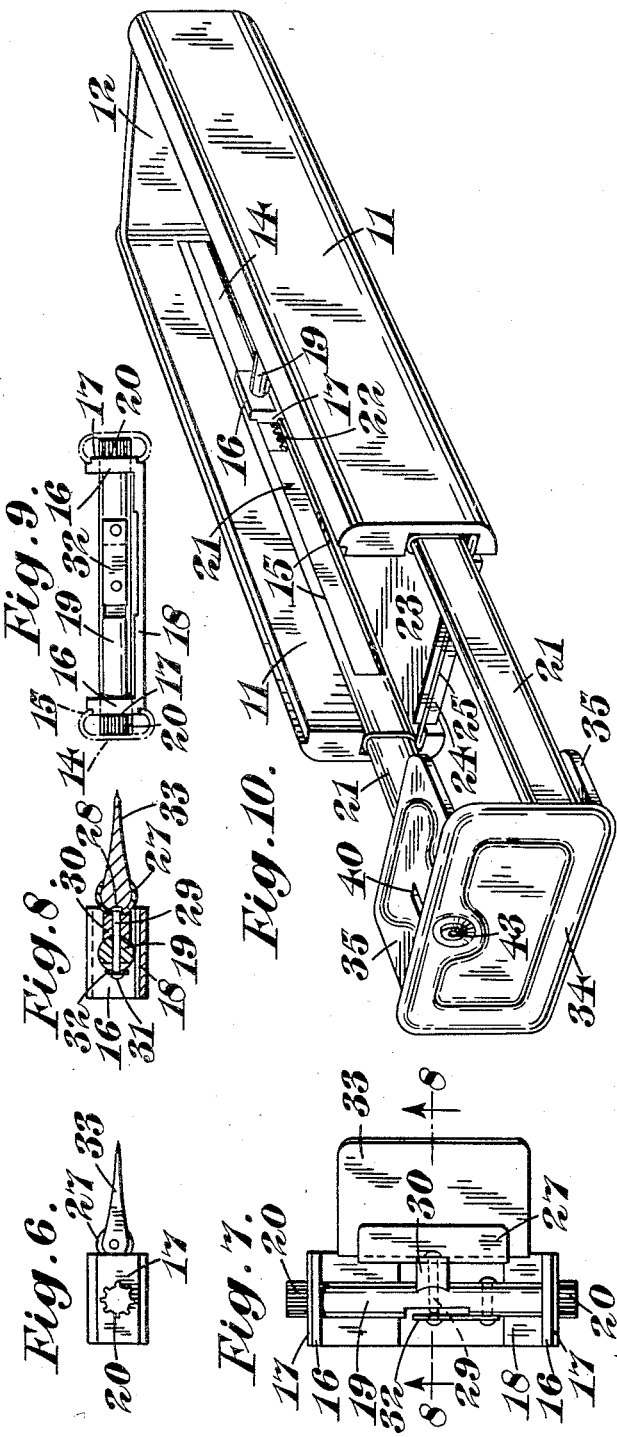

Patented Dec. 17, 1935

2,024,272

UNITED STATES PATENT OFFICE 2,024,272

STROPPING AND HONING DEVICE

William Brown, Sheffield, England, assignor of one-half to Darwins Limited, Sheffield, England Application September 20, 1933, Serial No. 690,258
In Great Britain November 1, 1932

7 Claims. (Cl. 51—153)

This invention relates to stropping, honing and like appliances of the type in which a blade holder is pivoted to a carriage which is reciprocated along guides at the sides of a strop or hone, and the blade holder is turned at the end of each reciprocation by a rack and pinion device, the object of the invention being to provide improvements in the construction and operation.

It has been proposed to mount a rack to turn or to slide on the carriage and to gear with a pinion on the blade holder spindle, the latter being turned at the end of each reciprocation by moving the rack on the carriage and the force to reciprocate the carriage and to apply sharpening pressure between the blade and strop or hone being transmitted through the rack and pinion.

According to the present invention, however, the rack is not mounted on the carriage but the blade holder is automatically turned by a construction in which a pinion at each end of the blade holder spindle axis gears with a rack rigidly carried by a slide housed in and movable along the carriage guide at the side of the strop or hone, and reciprocations of the slides are transmitted to the blade holder and thence to the carriage, through the racks and pinions.

The two slides are preferably connected by a cross piece providing one end of a box-like receptacle containing the carriage and the strop or hone and it will be appreciated that the cross piece forms a handle for operating the device, the construction being such that whenever the direction of movement of the slides is reversed the racks will first slide in relation to the carriage, turning the blade holder until the blade comes into contact with the strop or hone. Thereafter the carriage will be caused to move with the slides along the guides, power being transmitted through the rack teeth and pinions to the blade holder and thence both to the carriage to reciprocate it and to the blade to apply the desired sharpening pressure. If desired friction devices may be provided between the carriage and its guides or between the carriage and the strop or hone for increasing the sharpening pressure by providing additional resistance to movement of the carriage.

The guides for the slides and racks are conveniently of a channel-like section with the channel walls turned round so that the edges face each other, the carriage being guided by the facing edges of the channel walls. The carriage preferably comprises end brackets having slide projections fitting between the facing edges of the channel walls, the blade holder being journalled in these end brackets which are connected by a base portion.

The blade holder preferably comprises a slotted spring sleeve, the blade being located therein by engagement of a protuberance in the sleeve with a recess in the back of the blade. The spring sleeve may be flexibly connected to the blade holder spindle journalled in the carriage by means of an intermediate part attached to both the sleeve and the spindle with a certain amount of play at one or both of such attachments. Conveniently the intermediate member is riveted to the spring sleeve, the head of the rivet providing the protuberance referred to above for engagement by a recess in the back of the blade in order to locate the parts in their proper positions.

The intermediate member may be shaped to fit the spindle and be provided with a stud which passes through a hole in the spindle and is riveted or otherwise loosely secured thereto. A spring may be provided normally taking up the play provided between the spring sleeve and the spindle.

In the accompanying drawings:—

Figure 1 is a plan of a stropping and honing appliance according to the present invention, with the cover removed.

Figure 2 is a sectional elevation of Figure 1.

Figure 3 is a detached elevation of the cover of the appliance shown in Figures 1 and 2.

Figure 4 is an end view of Figure 3.

Figure 5 is a transverse section of the appliance with the cover in place.

Figure 6 is a detached elevation of the carriage and blade holder.

Figure 7 is a plan of Figure 6.

Figure 8 is a sectional elevation on the line 8—8 of Figure 7.

Figure 9 is a side elevation of Figure 6.

Figure 10 is a perspective view of the appliance.

Like reference numerals indicate like parts throughout the drawings.

In carrying out the present invention a box-like receptacle is provided comprising two sides 11 and an end 12. The sides 11 and end 12 are preferably joined by a base 13 as shown in Figures 2 and 5 although, in some cases, the strop or hone may itself form the base.

Each of the sides 11 carries or is shaped to provide guides 14 for the blade holder carriage and, in the construction illustrated, these guides 14 are of a channel-like section with the channel walls turned round as shown at 15 to be parallel to the base of the channel 14.

The blade holder carriage comprises end brackets 16 having slide projections 17 fitting between the in-turned edges 15 of the guides 14 as clearly shown in Figures 5 and 9. The end brackets 16 are connected by a base portion 18 and a spindle 19 is journalled in the end brackets 16. The spindle 19 carries a pinion 20 at each end located in the guides 14.

A slide 21 is mounted to move longitudinally in each of the guides 14 and at one end each of the slides 21 is provided with a rigid rack extension 22 gearing with one of the pinions 20. The slides 21 are shaped to fit in the channel guides 14 so as to be housed therein and their rack extensions 22 are sufficiently reduced in size to pass between the pinions 20 and the adjacent parts of the guides 14.

A sharpening surface is fitted in the box-like receptacle of the apparatus between the carriage 16, 18 and the base 13. Such a sharpening surface may be secured to, or form the base 13 but, as illustrated, there are preferably two sharpening surfaces, namely, a strop 23 and a hone 24 secured to opposite faces of a suitable plate 25 which may be clamped in grooves along the sides 11 by one or more spring loaded plungers 26. By removing the plate 25 and replacing it in a reversed position, the hone 24 may be substituted in operative position for the strop 23.

The blade holder comprises a slotted spring sleeve 27 which is riveted at 28 by a rivet 29 to an intermediate member 30 flexibly connected to the spindle 19 of the carriage in any suitable manner, such as by means of the rivet 29 passing through both the intermediate member 30 and the spindle 19, a head 31 of the rivet being on one side of the spindle 19 and the intermediate member 30 on the other side with the desired amount of play between these parts. As shown in Figures 7, 8 and 9 the intermediate member 30 is preferably shaped to fit against the spindle 19, and in order to enable the blade holder sleeve 27 to be turned at right angles to the spindle 19 to facilitate the insertion of a blade in the holder and its withdrawal therefrom, a spring 32 may be riveted to the spindle 19 and engage between the spindle 19 and the rivet head 31 preferably at a recessed part of the spindle. The spring 32 and recess, or the spring alone if bent away from the spindle, will thus both take up and provide the play required in the attachments of the blade holder 27 to the spindle 19, as well as enable the sleeve 27 to be turned round the axis of the rivet 29.

A hollow ground blade 33 is illustrated in Figures 6, 7 and 8 and it will be appreciated that it may be held in the carriage by sliding it lengthwise along the slot of the spring sleeve 27. The blade 33 is preferably located in a central position by providing its back with a recess or depression to be engaged by the head 28 of the rivet 29, or by any other suitable protuberance.

The two slides 21 are connected at the ends remote from their rack extensions 22 by a cross piece 34 which may provide both one end of the box-like receptacle of the apparatus and a handle for reciprocating the slides 21 along the guides 14. The cross piece 34 may, however, be provided with flange extensions 35 to be used as a handle when grasping the cross piece to operate the apparatus.

Assuming the blade to be in the blade holder sleeve 27 in the position shown in Figure 1, and that the cross piece 34 of the slides 21 be moved towards the apparatus to close the box-like receptacle, the racks 22 will first slide in relation to the carriage 16, 18 turning the pinions 20 clockwise as viewed in Figure 2 until the blade 33 comes to rest on the strop 23 on the opposite side of the spindle 19. Thereafter the carriage itself will be caused to move with the slides 21 along the guides 14, 15 and it will be appreciated that power applied to the slides 21 will be transmitted through the rack teeth 22 and pinions 20 to the blade holder 19 and thence both to the carriage to reciprocate it and to the blade 33 on the strop 23 to apply the desired sharpening pressure. This sharpening pressure is proportional to the resistance to movement opposed by the carriage and the friction between the blade and strop, and means may be provided for adjusting the sharpening pressure by varying the resistance to movement of the carriage. For this purpose friction devices may be provided between the carriage brackets 16 or the spindle 19 or pinions 20 and the guides 14, 15 or between the carriage and the strop or hone. Such friction devices may be adjustable. Thus, for example, adjustable spring plungers carried by the brackets 16 may bear on the guides 14, or a spring or springs may be fitted to the base 18 of the carriage to bear against the sharpening surface.

When the direction of reciprocating the slides 21 is reversed the mere act of reversal will cause the racks 22 first to slide in relation to the carriage 16, 18 and thereby to turn the blade 33 over to the side of the spindle 19 on which it is shown in Figure 1. After the blade 33 has come into contact with the strop 23 the longitudinal movement of the slides 21 will be communicated to the carriage and to the blade.

It will be appreciated that the flexible connection of the holder 27 to the spindle 19 will enable the blade 33 automatically to bear evenly on the strop 23 or hone 24.

The box-like receptacle of the device is preferably provided with a lid or cover 36 having an inturned hook-like flange 37 at one end to engage a suitable recess 38 of the box end 12 as shown in Figures 2 and 3. At its other end the lid 36 is provided with a catch 39 passing through a slot 40 in the upper flange 35 of the cross-piece handle 34 and adapted to engage the head 41 of a spring-controlled plunger 42 having an operating button 43 accessible outside the cross piece 34. By pressing the button 43 the plunger 42 may be moved against the action of its spring 44 to release its head 41 from the catch 39. The catch 39 is preferably provided with an inclined cam portion 45 co-operating with the head 41 of the plunger 42 to raise the lid 36 sufficiently to facilitate access of the fingers to remove it.

The lid may be fitted with spring clips 46 to grasp a safety razor 47 and to hold it inside the apparatus for storage and transport purposes.

In a modified method of attaching the intermediate member 30 to the spindle 19, the end of the member 30 may loosely embrace the spindle which may be provided with collars or may be recessed to prevent relative sliding movement, any suitable means being provided for preventing or limiting relative rotation of the intermediate member 30 and spindle 19. Or a set screw, pin or the like may project inside the part of the intermediate member which embraces the spindle and may engage a suitable recess in the spindle.

What I claim is:—

1. In a razor sharpening appliance, the combination of a frame comprising two sides and a fixed end permanently connecting the sides, a base providing a sharpening surface joining the sides and end of the frame, guides exposed along the inner faces of the two sides of the frame, a carriage slidable along the guides, a blade holder carried by a spindle pivoted to the carriage, a slide housed in and movable along each of the carriage guides, a rack rigidly carried by each slide within its guide, a pinion at each end of the blade holder spindle gearing with one of the racks, a connection between the slides outside the guides providing a movable end of a box-like receptacle formed by the frame and base, and a lid adapted to engage the frame and movable end to lock the slides and to close the receptacle.

2. In a razor sharpening appliance, the combination of a box-like receptacle comprising two sides, a fixed end and a base, guides exposed inside the receptacle along its sides, a blade holder carriage slidable along the guides, a slide housed in and movable along each of the carriage guides and operatively connected to the carriage, a connection between the slides adapted to form a movable end of the receptacle, a lid adapted to engage the fixed end of the receptacle and to lock the slides, a spring catch adapted to connect the lid to the movable end and means causing release of the catch to move the lid from the movable end.

3. In a razor sharpening appliance, the combination of a pair of longitudinally extending parallel guides of hollow channel cross-section disposed with their channels inwards and facing one another, a pair of racks housed within and slidably guided by the channels of the guides, a carriage disposed between, engaging, and slidably guided by the guides, a spindle journalled in the carriage, a blade holder non-rotatably attached to the spindle, pinions secured respectively to the ends of the spindle entering within the channels of the guides and engaging the racks, means for simultaneously reciprocating the racks and a sharpening element extending between the guides.

4. In a razor sharpening appliance, the combination of a pair of parallel longitudinally extending guides of hollow channel cross-section disposed with their channels inwards facing one another, a pair of slides extending along, and slidably guided by the inner faces of the hollow guides, racks respectively carried upon corresponding ends of the slides and housed within the channels of the guides, a carriage disposed between, engaging and slidably guided by the guides, a spindle journalled in the carriage, a blade holder non-rotatably carried by the spindle, pinions secured to each end of the spindle, located each within the channel of a guide and meshing each with a rack to form the sole operative connection between the slides and the spindle and carriage, and a sharpening surface extending between the guides.

5. In a razor sharpening appliance, the combination of a pair of side members, an end member and a base member joined together to form four of the sides of a rectangular box, a pair of longitudinally extending guides upon the inner sides of the side members, a pair of slides extending longitudinally between the side members and slidably guided by the guides, racks respectively carried upon corresponding ends of the slides, a carriage disposed between the side members, slidably engaging and guided by the guides, a spindle journalled in the carriage, a blade holder non-rotatably carried by the spindle, pinions secured to each end of the spindle and meshing each with a rack to form the sole operative connection between the slides and the spindle and carriage, and a sharpening surface extending between the side members.

6. In a razor sharpening appliance, the combination of a pair of side members, an end member and a base member joined together to form four of the sides of a rectangular box, a pair of longitudinally extending guides of hollow channel cross-section disposed with their channels facing one another upon the inner sides of the side members, a pair of slides extending along and slidably guided by the inner faces of the hollow guides, racks respectively carried upon the ends of the slides and housed within the channels of the guides, a carriage disposed between, engaging and slidably guided by the guides, a spindle journalled in the carriage, a blade holder non-rotatably carried by the spindle, pinions secured to each end of the spindle, located each within the channel of a guide and meshing each with a rack to form the sole operative connection between the slides and the spindle and carriage, and a sharpening surface extending between the side members.

7. In a razor sharpening appliance, the combination of a pair of parallel longitudinally extending guides of hollow channel cross-section, the walls of each of the side channel guides being turned inwardly so that the edges face each other, a pair of slides extending along, and slidably guided by the inner faces of the hollow guides, racks respectively carried upon corresponding ends of the slides and housed within the hollow guides, a carriage disposed between the hollow guides, projections upon the ends of the carriage fitting between the facing edges of the channel walls, a spindle journalled in the carriage, a blade holder non-rotatably carried by the spindle, pinions secured to each end of the spindle, located each within the channel of a guide and meshing each with a rack to form the sole operative connection between the slides and the spindle and carriage, and a sharpening surface extending between the guides.

WILLIAM BROWN.